United States Patent
Grimm et al.

(10) Patent No.: US 10,214,163 B2
(45) Date of Patent: Feb. 26, 2019

(54) APPARATUS FOR SMART ANTENNA SHARING IN A VEHICLE AND METHODS FOR IMPLEMENTING THE APPARATUS

(71) Applicant: GM Global Technology Operations LLC, Detroit, MI (US)

(72) Inventors: Donald K. Grimm, Utica, MI (US); Timothy J. Talty, Beverly Hills, MI (US); Duane S. Carper, Davidson, MI (US); Daniel J. Forest, Macomb, MI (US); Esayas Naizghi, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/768,150

(22) PCT Filed: Feb. 17, 2014

(86) PCT No.: PCT/US2014/016705
§ 371 (c)(1),
(2) Date: Aug. 14, 2015

(87) PCT Pub. No.: WO2014/127323
PCT Pub. Date: Aug. 21, 2014

(65) Prior Publication Data
US 2015/0375695 A1  Dec. 31, 2015

Related U.S. Application Data

(60) Provisional application No. 61/765,243, filed on Feb. 15, 2013.

(51) Int. Cl.
*B60R 16/023* (2006.01)
*G05B 19/042* (2006.01)
(Continued)

(52) U.S. Cl.
CPC ........ *B60R 16/023* (2013.01); *G05B 19/0428* (2013.01); *H04W 4/046* (2013.01); *H04W 4/027* (2013.01)

(58) Field of Classification Search
CPC ............ B60R 16/0234; B60R 16/0232; B60R 16/0231; B60R 16/023; H04W 4/027; H04W 4/046; G05B 19/0428
(Continued)

(56) References Cited

U.S. PATENT DOCUMENTS 5,794,164 A * 8/1998 Beckert .................. B60R 11/02
455/3.06
6,321,151 B1 * 11/2001 Shultz .................. G01M 15/05
340/12.22
(Continued)

FOREIGN PATENT DOCUMENTS

| DE | 102009038479 | 2/2011 |
| WO | 2008124805 | 10/2008 |
| WO | 2011019501 | 2/2011 |

OTHER PUBLICATIONS

2008 GMC Yukon Owner Manual; pp. 2-60 through 2-63, 3-114.*
(Continued)

*Primary Examiner* — Stephen Holwerda
(74) *Attorney, Agent, or Firm* — Tiffany N. Logan; Parks IP Law LLC

(57) ABSTRACT

A plug-in communication system, for implementation with a vehicle. The system in one aspect includes an onboard diagnostics port-expansion device, configured for mounting in the vehicle to, or adjacent, an onboard diagnostics port, and an onboard diagnostics port expansion connection line extending from the onboard diagnostics port-expansion device, the connection line being configured to connect the port-expansion device to one or more vehicle components. In another aspect, the system includes an inline remote-
(Continued)

services terminal configured for wired connection inline, via a plurality of connection lines, to a remote-services module of the vehicle, a first connection line, of the plurality of connection lines, configured to connect to the inline remote-services terminal and to the remote-services module, and a second connection line, of the plurality of connection lines, configured to connect to the inline remote-services terminal and to the remote-services module.

16 Claims, 5 Drawing Sheets

(51) Int. Cl.
  *H04W 4/04* (2009.01)
  *H04W 4/02* (2018.01)
(58) Field of Classification Search
  USPC .............................. 701/31.4, 31.5, 32.4, 33.2
  See application file for complete search history.

(56) References Cited

U.S. PATENT DOCUMENTS

| | | | |
|---|---|---|---|
| 6,816,760 B1* | 11/2004 | Namaky | G06F 11/2733 701/33.2 |
| 7,484,008 B1 | 1/2009 | Gelvin | |
| 7,596,435 B1* | 9/2009 | Tripathi | G07C 5/008 701/29.3 |
| 8,138,902 B2 | 3/2012 | Zinser | |
| 2007/0005201 A1 | 1/2007 | Chenn | |
| 2007/0093947 A1* | 4/2007 | Gould | G07C 5/008 701/31.5 |
| 2007/0198147 A1* | 8/2007 | Keith | G01R 31/007 701/31.4 |
| 2008/0015748 A1* | 1/2008 | Nagy | G07C 5/008 701/31.4 |
| 2008/0255888 A1* | 10/2008 | Berkobin | G06Q 40/08 705/4 |
| 2009/0043444 A1* | 2/2009 | Gettner | G01C 22/00 701/31.4 |
| 2009/0195370 A1 | 8/2009 | Huffman et al. | |
| 2010/0036985 A1 | 2/2010 | Zinser | |
| 2012/0252475 A1 | 10/2012 | Farrell | |
| 2012/0324046 A1 | 12/2012 | Park | |
| 2013/0006674 A1 | 1/2013 | Bowne et al. | |

OTHER PUBLICATIONS

International Search Report in related PCT/US14/16705, dated Aug. 21, 2014.
Supplementary European Search Report dated Sep. 15, 2016 for related European Patent Application No. 14751207.3.
Supplementary European Search Report dated Feb. 3, 2017 for related EP Patent Application No. 14751207.3
English Abstract of DE102009038479.

* cited by examiner

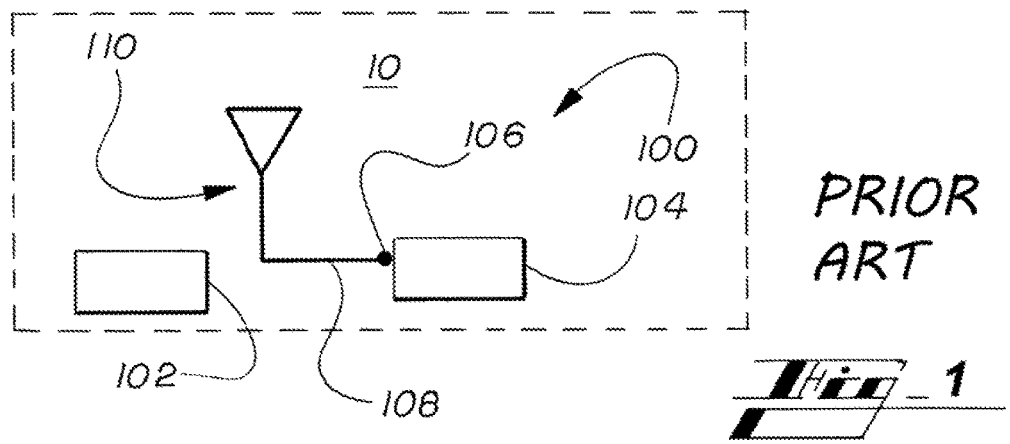
FIG_1 PRIOR ART
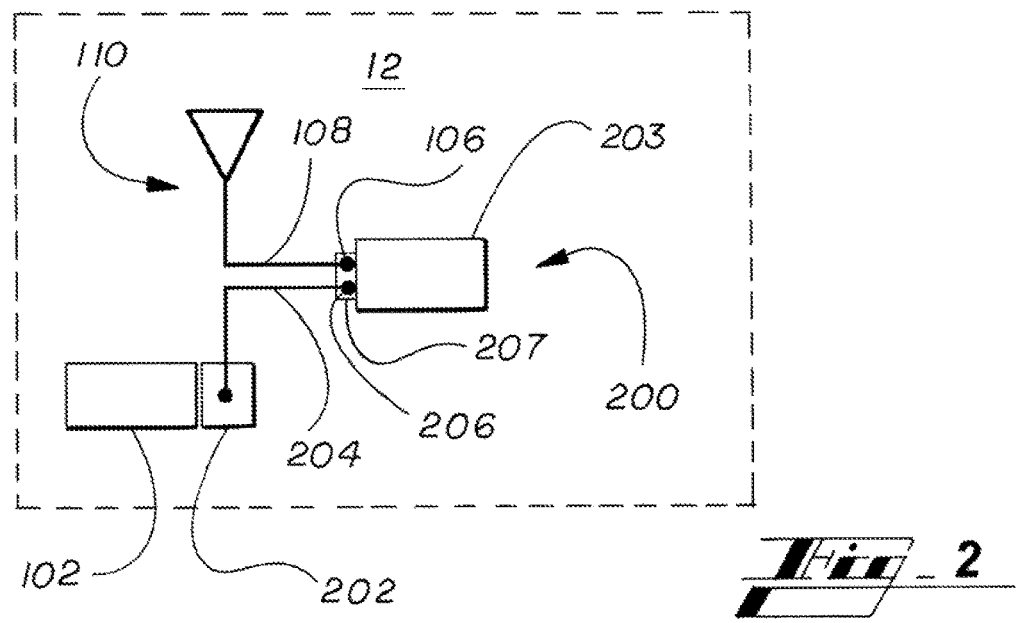
FIG_2
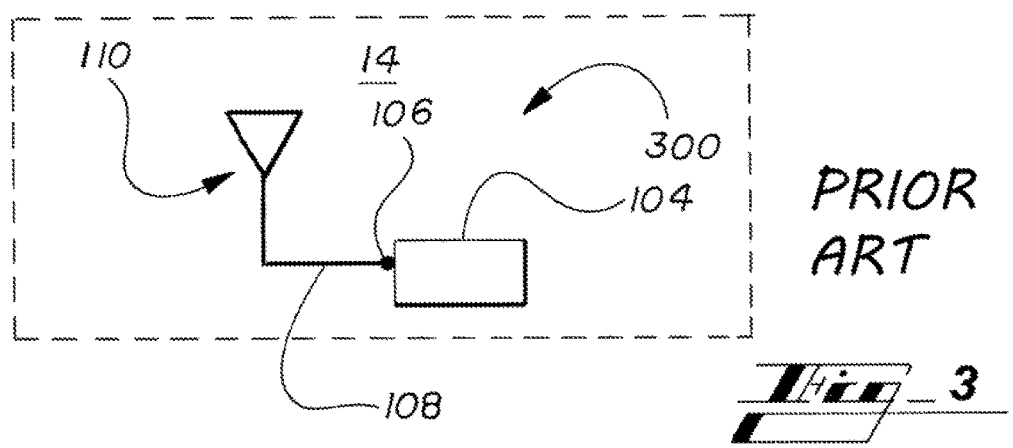
FIG_3 PRIOR ART

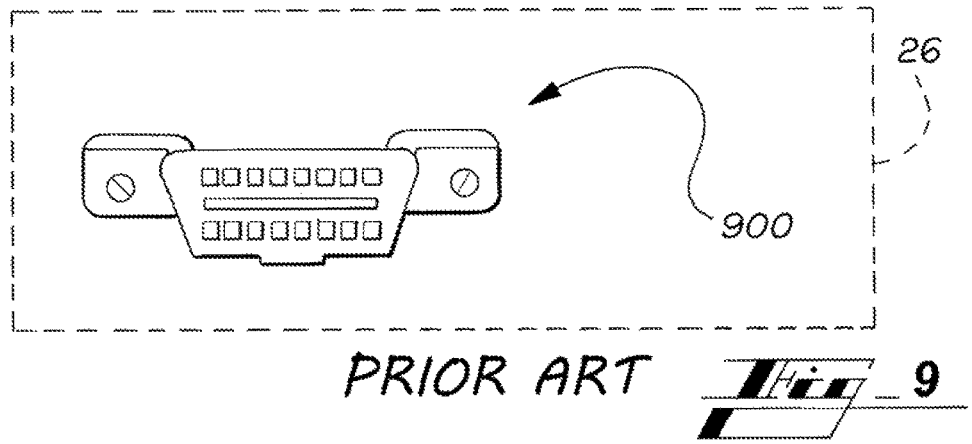
PRIOR ART FIG. 9
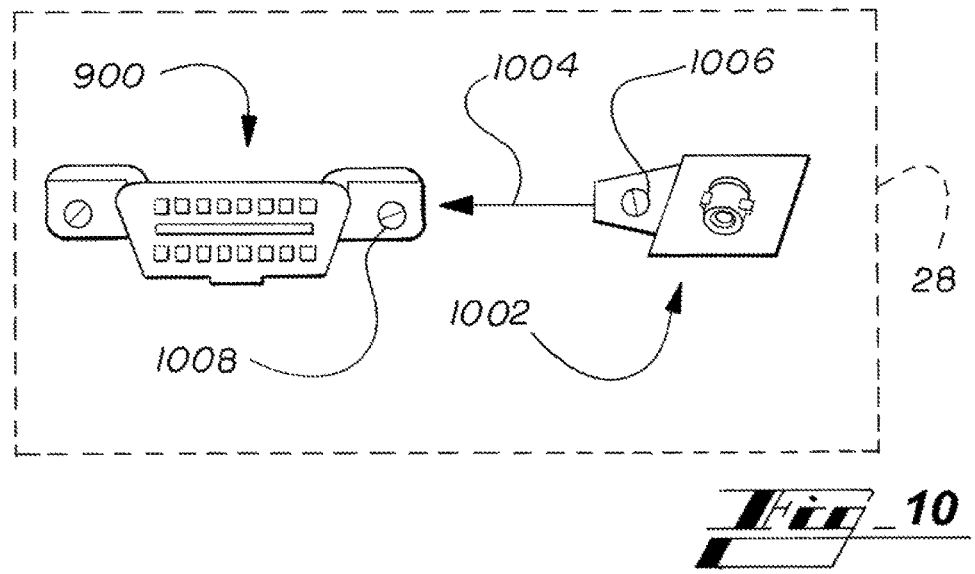
FIG. 10
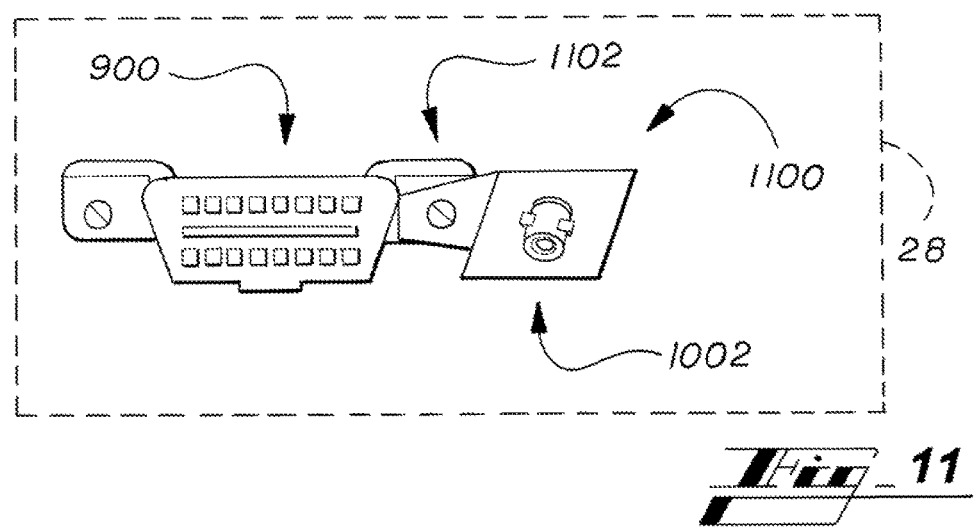
FIG. 11

APPARATUS FOR SMART ANTENNA SHARING IN A VEHICLE AND METHODS FOR IMPLEMENTING THE APPARATUS

TECHNICAL FIELD

The present disclosure relates generally to apparatus for smart antenna sharing in a vehicle and, more particularly, to systems and methods for providing access for plug-in or existing communication or safety systems to pre-existing vehicle antenna, power, and data resources.

BACKGROUND

Since 1996, every automobile manufactured in the United States is required to have an onboard diagnostics (OBD) system, including an OBD connector. The currently-required system is a second generation, OBD-II system.

The OBD-II connector, or port, has sixteen (16) pin receptacles in two rows of eight, as shown in FIG. 9. According to current requirements, the OBD-II connector must be positioned within two feet of the steering wheel, unless an exemption is approved for the manufacturer, in which case the connector must still be generally within reach of the driver.

The OBD system enables the vehicle to self-diagnose potential problems with the vehicle, and report the same, such as to diagnostic equipment that can be connected to the system. The OBD system allows, for instance, the vehicle owner or a repair technician access to state-of-health information for various vehicle sub-systems.

The OBD-II standard specifies a type of diagnostic connector and its pinout, electrical signaling protocols available, and a messaging format. Regarding assigned pins, there is, for example, a pin providing power, from the vehicle battery, which can be used for a scan tool. This eliminates need to connect the scan tool to a separate power source.

Modern vehicles are also increasingly being outfitted with short-range, medium-range, and long-range communication capabilities. The capabilities are generally provided by an original-equipment-manufacturer (OEM) equipment of the vehicle.

An example communication system is a dedicated short-range communications (DSRC) system. DSRC can be used for, among other uses, transmission of emergency-related communications to and from the vehicle.

Communication and safety systems require a power source, for powering the transceiver, and an antenna resource for improving reception capabilities.

The OBD-II system provides convenient access to power and a reception antenna. And some of the pins of the OBD-II connector are open for use. Regulatory restrictions, though, prohibit using the OBD-II to carry proprietary signals, such as those of an onboard wireless communications system (e.g., DSRC system) because using the OBD connector to carry proprietary signals could interfere with OBD operations, such as scanning-tool or other diagnostic functions.

SUMMARY

The present disclosure relates to apparatus for smart antenna sharing in a vehicle of transportation, such as an automobile. The disclosure relates more particularly to systems and methods for providing access, for plug-in, or add-on vehicle communication and/or safety systems, to existing vehicle antenna, power, and/or data resources, such as resources provided in the vehicle by the OEM.

The plug-in can include add-on hardware and/or software, and be available directly or via distributors such as vehicle dealerships, for example. The plug-in may be purchased via such channels by a vehicle owner or vehicle-servicing company, for instance.

The technology can, as mentioned, be used to augment existing communication services, such as a DSRC system already installed at the vehicle.

In one aspect, the technology relates to a plug-in communication system for implementation at a vehicle, such as an automobile. The system may include (i) an onboard diagnostics (OBD) port-expansion device, configured for mounting in the vehicle to, or adjacent to a vehicle OBD port, and (ii) an OBD expansion connection line extending from the OBD port-expansion device. The connection line is configured to connect the port-expansion device to one or more vehicle components.

In another aspect, the system includes an inline remote-services terminal. The terminal is configured for wired connection inline, via a plurality of connection lines, to a remote-services module of the vehicle. The system of this aspect also includes a first connection line, of the plurality of connection lines, configured to connect to the inline remote-services terminal and to the remote-services module. The system of this aspect also includes a second connection line, of the plurality of connection lines, configured to connect to the inline remote-services terminal and to the remote-services module.

Other aspects of the present technology will be in part apparent and in part pointed out hereinafter.

DESCRIPTION OF THE DRAWINGS

FIG. 1 illustrates schematically a first system of a conventional vehicle, comprising an onboard diagnostics connector, or port, a remote-services module, and a remote-services antenna.

FIG. 2 illustrates schematically a system, according to a first embodiment of the present technology, comprising an onboard diagnostics port-expansion device linked by connection line to a remote-services module, which is in turn connected to a remote-services antenna.

FIG. 3 illustrates schematically a second conventional vehicle comprising a remote-services module and a remote-services antenna, like the view of FIG. 1, but without an onboard diagnostics port.

FIG. 9 shows a front, facial, view of an onboard diagnostics connector or port.

FIG. 10 shows an onboard diagnostics port-expansion device in the process of being connected to or adjacent the onboard diagnostics port of FIG. 9.

FIG. 11 shows the onboard diagnostics port-expansion device, following the act of FIG. 10, connected to the onboard diagnostics port.

DETAILED DESCRIPTION

Figure 4:
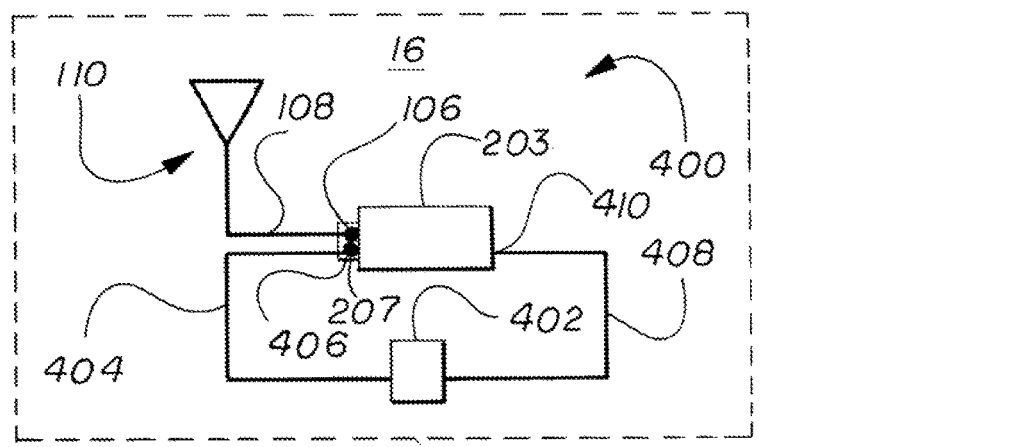
FIG. 4 illustrates schematically a system, according to a second embodiment of the present technology, comprising an inline remote-service terminal connected inline via two connection lines to a remote-services module, which is in turn connected to a remote-services antenna.

As required, detailed embodiments of the present technology are disclosed herein. The disclosed embodiments are merely examples that may be embodied in various and alternative forms, and combinations thereof. As used herein, for example, "exemplary," and similar terms, refer expansively to embodiments that serve as an illustration, specimen, model, or pattern.

The figures are not necessarily to scale and some features may be exaggerated or minimized, such as to show details of particular components.

In some instances, well-known components, systems, materials or methods have not been described in detail in order to avoid obscuring the present disclosure.

Specific structural and functional details disclosed herein are therefore not to be interpreted as limiting, but merely as a basis for the claims and as a representative basis for teaching one skilled in the art to employ the present disclosure.

I. OVERVIEW OF THE DISCLOSURE

In various embodiments, the present disclosure describes apparatus for smart antenna sharing in a vehicle, including systems allowing access for plug-in or existing vehicle communication or safety systems to pre-existing vehicle antenna, power, and data resources, such as resources provided in the vehicle by the original equipment manufacturer (OEM).

Generally, the present technology provides an easy, convenient way to share an existing vehicle antenna, or other already-present vehicle resources, such as a remote-services module, with a new plug-in communication or safety system, or to augment an existing communication or safety system.

The systems in some embodiments include a new onboard diagnostics (OBD) port expansion component. As described further below, the OBD port expansion component is in some embodiments positioned adjacent an existing onboard diagnostics connector.

The new OBD port expansion component is in some embodiments connected to an existing vehicle antenna.

In some embodiments, the OBD port expansion component is linked, as referenced above, to an existing on-vehicle remote-services module, such as a module associated with services provided by a remote customer center, such as the OnStar® customer-service center. OnStar® remote facilities include automated systems and personnel that interact with vehicles and their users via long-range communications, such as satellite or cellular communications, or via medium and/or short-range communications. (OnStar is a registered trademark of OnStar, LLC, a subsidiary of the General Motors Company)

In one embodiment, implementing the present technology includes installing a new safety or communication module, such as a DSRC device, in-line with an existing in-vehicle remote-services module. A connection between the new communication device and the module can comprise a first, reception-based connection, such as including a radio-frequency (RF) cable, to the remote-services module, and/or a second, data and power, connection to the remote-services module.

In one embodiment, an automated controller, such as a body control module (BCM) of the vehicle is connected to one or more of the system components for providing data (e.g., instructions) to, and/or receiving data from, the system components. The automated controller in some embodiments includes a processor. The controller can be linked to one or more of (a) the remote-services module, (b) the onboard diagnostics (OBD) connector, (c) the OBD port expansion component, and (d) other system components, as described further below.

II. FIG. 1—FIRST EXAMPLE CONVENTIONAL ARRANGEMENT

Now turning to the figures, and more particularly to the first figure, FIG. 1 illustrates schematically a first system 100, of a first conventional vehicle 10.

The system 100 includes an onboard diagnostics (OBD) component 102, such as an OBD-II port, or connector. As mentioned, a face of such a connector is provided in FIG. 9. As referenced above, an OBD-II connector, having two rows of eight pins, or receptacles, enables the vehicle to self-diagnose potential problems with the vehicle and report the same. The OBD connector can also allow, by a vehicle owner or a repair technician, for example, to state-of-health information related to various vehicle operations.

The OBD-II standard specifies a type of diagnostic connector and its pinout, the electrical signaling protocols available, and the messaging format. There is a pin dedicated to providing power, from the vehicle battery, for a scan tool, which eliminates need to connect the scan tool to a separate power source.

The system 100 further includes a remote-services module 104 and a remote-services connection point 106 connecting the remote-services module 104 to a connection line 108. The connection line 108 connects the remote-services module 104 to a remote-services antenna 110. As provided in the Summary, above, an example in-vehicle remote-service system, for connecting to a remote-services customer-service center, is the in-vehicle OnStar® system.

III. FIG. 2—OBD PORT EXPANSION-TO-REMOTE-SERVICES ANTENNA

FIG. 2 illustrates schematically a system 200 according to a first embodiment of the present technology. The system 200 provides a first exemplary plug-in arrangement in association with a host vehicle 12, also shown schematically.

The system 200 includes a diagnostics connector, or port. Because the port can be the same or similar to the OBD-II connector of FIG. 1, the port is identified in FIG. 2 by reference numeral 102 in FIG. 2, and may be referred to as the OBD port, or OBD-II port at times herein, for ease of description.

With continued reference to FIG. 2, the system 200 comprises an onboard diagnostics port-expansion device 202. The port-expansion device 202 can be referred to by any of a wide variety of names without departing from the scope of the present disclosure.

Example names for the device 202 include OBD port expansion, OBDPE, port-expansion device, PED, OBD port-expansion device, OBDPE device, OBDPED, OBD or smart-antenna-sharing (SAS) port-expansion device, OBD or SAS port-expansion connector, OBD or SAS port expansion, OBD or SAS port expander, OBD or SAS linking device, auxiliary connector, auxiliary linking device, auxiliary antenna connector, auxiliary antenna port-expansion, auxiliary antenna port-expansion device, auxiliary sharing device, OBD peripheral, OBD peripheral device, smart-antenna auxiliary connector, SAS connector, the like, and other.

In one embodiment, the OBD port-expansion device 202 is connected to, or configured to connect to, the diagnostics port 102. Because the diagnostics port 102 can be, as required for OBD-II connectors, positioned or configured for being positioned, within a couple of feet of the steering wheel, or at least generally within reach of the driver, the onboard diagnostics port-expansion device 202 can likewise be positioned or configured for being positioned within a couple of feet of the steering wheel, or at least generally within reach of the driver.

When installed for operation on the vehicle 12, or in a manufacturing process, the onboard diagnostics port-expansion device 202 can be linked to a remote-services module 203. The module 203 is in turn connected to or configured to be connected to a remote-services antenna 110. As provided, an example remote-service is OnStar® remote service, and the remote-services module 203, in various embodiments, is, includes, or is part of an OnStar® module.

As also provided, the OnStar® system can use various facilities, including automated and those operated or monitored by personnel, for interacting with vehicles and their users via long-range communications, such as satellite or cellular communications, or via medium and/or short-range communications.

The onboard diagnostics port-expansion device 202 is linked by way of an OBDPED (or SAS) connection line 204 to the remote-services module 203 and/or antenna 110. As shown in FIG. 2, the onboard diagnostics port-expansion device 202 can connect to the remote-services module 203 via the SAS connection line 204 and a SAS connector-to-remote services module (SASC-to-RSM) connection point 206.

In one embodiment, the SASC-to-RSM (or StR) connection point 206 is the same as the remote-services (RS) connection point 106. In one embodiment, the StR connection point 206 is separate from and, for operation, connected to the RS connection point 106. In another embodiment, the new connection point 206 is positioned adjacent, or configured to be positioned adjacent, the RS connection point 106.

Any or all of the parts of the system 200 between and including the onboard port-expansion device 202 and the SAS-to-RSM connection point 206 can include relatively-simple circuitry facilitating transfer of power and/or data between the onboard port-expansion device 202 and the remote-services module 203, and thereby between the onboard port-expansion device 202 and the antenna 110. The circuitry is configured to adapt the system to performing the functions and operations described herein.

In one embodiment, the circuitry contained within the port-expansion device 202 contains frequency-selective elements. The circuitry could, for example, be configured to isolate one or more of multiple frequencies bands to enable passing certain frequencies along to the port-expansion device 202 connector (e.g., to another part of the PED 202) while passing other frequencies along to remote-services module 203.

In one particular embodiment, the circuitry is implemented as a frequency-selective circuit using diplexers chosen to pass short-range frequencies (e.g., DSRC frequencies) to the port-expansion device 202 (e.g., to another part of the PED 202) and to pass frequencies associated with cellular communications to the remote-services module 203.

In some embodiments, the circuitry in the port-expansion device 202 can also be configured to, and operate to, share common frequencies between the port-expansion device 202 (e.g., another part of the PED 202) and the remote-services module 203. As an example, both the port-expansion device 202 and the remote-services module 203 may use location-related frequencies (e.g., global positioning system (GPS) frequencies), and so the circuitry would provide information on a corresponding frequency to both of the device 202 and the module 203—e.g., GPS-frequency data is shared between the devices 202, 203.

Further regarding circuitry, the circuitry can include amplifiers, filters, the like and other signal processing features. For instance, the circuitry of the port-expansion device 202 can include one or more low-noise amplifiers and filters to facilitate provision of high- or at least higher-quality signals to the remote-services module 203, which can be helpful for situations in which condition of an original signal is weak or noisy, for instance.

The SAS connection line 204 is in one embodiment a radio-frequency (RF) coaxial cable. The line 204 is not, though, limited to being an RF coax cable, as other types of RF cables, coaxial cables, or other types of connection may be used without departing from the scope of the present disclosure.

In one embodiment, the system 200 is implemented so as to leverage at least one existing hardware or software element of the vehicle 12. As referenced above, e.g., the system 200 can leverage the first connection point 106, by using the same point (e.g., screw terminal or post) for the second connection point 206.

As another example of leveraging, the connection line 204 can be, include, or be a part of existing connections of or used by the remote-services system, such as connections of or used by the RS module 203, RS antenna 110, etc. The connection lines 204 can, for instance, be, include, or be a part of cellular cabling and/or other type of cabling already present for the remote-services system.

Additional embodiments involving the remote-services module 203, the port expansion device 202, the connection point 206, and/or the connection line 204 are described further below, in section XIV.

In one embodiment, the system 200 includes an intelligent connect/disconnect mechanism. The mechanism in one embodiment includes the onboard diagnostics port-expansion device 202 being configured to be selectively engageable, by a user or service provider of the vehicle 12, to selectively connect a communications component (not shown in detail) to the system 200.

The communications component can be, or be a part of, a dedicated short-range communications (DSRC) system, referenced above, or another short-, medium-, or long-range wireless communication system.

In one embodiment, the communication component is a pre-existing part of the vehicle 12. In such cases, connecting the communication component to the onboard diagnostic port-expansion device 202 augments, or improves, operation of the communication component. The augmentation, or improvement, follows the communication component gaining access to the resources, e.g., signal transmissivity, power, and/or data, available via OBD PED 202, the remote-services module 203 and/or the remote services antenna 110.

The communication component is in various embodiments a plug-in component. In some embodiments, the communication component contains one or more DSRC safety-related applications. The component, accordingly, could receive and read vehicle-related data, such as GPS data, brake data, yaw or other movement data, etc. The component could further deliver or otherwise use any of the data, whether modified, or resulting information prepared (e.g., at the component) using the data.

The providing or use, which in some cases can be referred to as writing back the data and/or information, in some embodiments includes communicating the data, the information, an indication of the same, and/or a conclusion based on the same, at the vehicle. The communication can include providing data, information, and/or an indicator for perception by a vehicle user or vehicle-servicing personnel, for example. The communication or indicator can be provided via an onboard display, light (e.g., in-vehicle LED), or speaker in the case of an audible indicator such as a chime message, for instance.

An example of using the data and/or information also includes affecting one or more operations of the vehicle. This can include selectively actuating the vehicle braking system, the throttle system, or the steering system, for instance.

The data can also be provided to a remote entity, such as the computerized and personnel of a remote customer center, like the OnStar® customer-service center.

In some embodiments, the communication component could use no serial data from the onboard diagnostics connector (e.g., OBD-II port). In this case, the communication component could operate in a standalone mode. The component in the standalone mode would be more self-sufficient, such as by using location data (e.g., GPS data) generated at the component instead of relying on location data from another component or entity.

The component in the standalone mode can also use so-called open data. The data is referred to as open data because it is available to the public, or standard users or vehicle services, as compared to private data, such as proprietary data, which may be available only to the OEM.

In various embodiments, the component in the standalone mode can also access the propriety data.

In some embodiments, the component communicates uni- or bi-directionally with a remote entity, such as the OnStar® service center, via an onboard module, like remote-services module 203, or with other vehicle modules.

Communications and signals can also be provided to and/or from such other vehicle modules via an auxiliary connection, such as one associated with connection line 108 and/or other connection associated with the antenna. The connection in one embodiment includes one or more dedicated data interfaces to other vehicle modules.

The system 200, including the onboard diagnostics port-expansion device 202, is configured so as not to, in operation, interfere with functions of the onboard diagnostics port 102 (e.g., OBD-II). That is, the onboard diagnostics port-expansion device 202, and the system 200 components connected thereto are configured and assembled so as to not, in use, interfere with operation of any diagnostic functions, such as those performed by any scanning tools that may be plugged into the OBD-II 102.

In one embodiment, the vehicle 12 includes in connection with the antenna a radiating element to which the system 200 can connect.

In some embodiments, the vehicle antenna 110 includes frequency-selective structures that transmit and/or receive signals of various desired frequencies, e.g., AM/FM radio, cellular, GPS, XM radio, WIFI, and DSRC. Frequency selective structures are commonly referred to as radiating elements even though the structures can be used for both radiating and receiving.

In addition to the system 200 enabling convenient and easy connection, by a user or service-personnel, of existing, or new plug-in, communication devices to the smart-antenna-sharing sub-system (e.g., OBDPE 202, line 204, RS module and/or antenna 203, 110, etc.), the system 200 is also configured to create and promote a secure connection between the communication device(s) and the new SAS sub-system, the SAS sub-system including the OBD port expansion device, or "smart-antenna-sharing" (SAS) device 202, the OBDPED (or SAS) connection line 204, the RS module 203, and/or the antenna 110, etc.

In one embodiment, the security features are provided by any or all of the new sub-system, being configured to allow use of the sub-system only selectively. In one embodiment, a controller—e.g., a vehicle BCM (cross reference numeral 702 in FIG. 7), employs the security logic.

The sub-system can be configured to protect against access to the system, such as to a vehicle antenna or module such as a remote-services module, or to certain signals or data thereof/thereto/therefrom. In one embodiment, the security ensures that full system and data access is allowed only for devices intended by a manufacturer of the vehicle or system 200 (e.g., OEM) or otherwise pre-authorized to do so.

In one embodiment, described further below in connection with FIG. 13, the algorithm is configured to determine whether the system should operate in a standalone mode with respect to an add-on communication device (e.g., DSRC plug-in) or operate in a connected, communication, or fully-authorized mode, with respect to the add-on device. It is contemplated that the communication device could also or instead operate in a corresponding standalone or connected mode.

In the standalone mode, the communication device (e.g., DSRC plug-in module) is allowed to use a vehicle antenna, but its access to vehicle data is limited. For example, the system can be configured so that a DSRC plug-in module can have access to vehicle location information, such as GPS data—e.g., GPS time, GPS Lat, Long, GPS speed. In one embodiment, the plug-in module has a GPS or other location unit for determining the location data.

In the fully-authorized mode, the communication device (e.g., DSRC plug-in module) has access to, or generates, the same vehicle location information, and also other vehicle data, such as movement and operation data. Example vehicle data includes vehicle state data, brake status (e.g., whether ABS is active), suspension status (e.g., whether stability control system is active), and acceleration (in any direction, such as longitudinal).

In one embodiment, the protection is provided by security protocols, such as those requiring use of hand-shake exchanges, e.g., of passcode data, other authentication exchanges, or use of a select frequency or data carrier type (e.g., message type). Other example protocols are described below.

Figure 7:
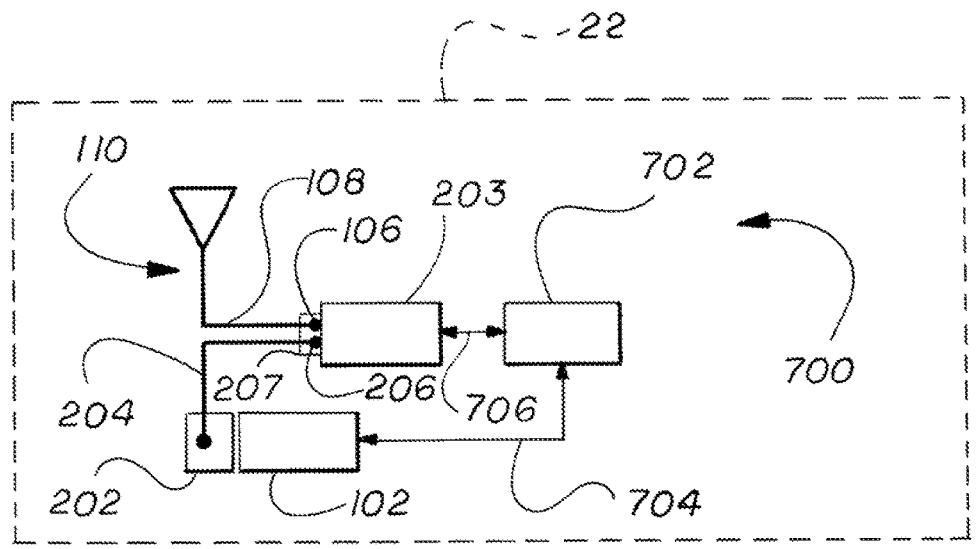
FIG. 7 illustrates schematically a system, according to a fourth embodiment of the present technology, comprising components like those of the first embodiment, shown in FIG. 2, along with an automated device (e.g., onboard computer) connected operatively to the remote-service module and the onboard diagnostics port for affecting operations associated with the module and port.

As referenced above, in some embodiments, local authentication procedures or protocols between the plug-in device (e.g., DSRC) and onboard vehicle module—which may be a part of or include the BCM or other vehicle computer, as indicated for example at 702 of FIG. 7—may be used to enable secure access to the shared antenna system. A security protocol between the plug-in device and the onboard vehicle module may be used, e.g., to approve access for the device to vehicle data and/or operations (e.g., antenna use). The protocol can include a required exchange, such as a challenge/response by which the vehicle (e.g., BCM) issues a challenge and the plug-in device is required to compute and return a valid response in order to acquire antenna access. Other authentication means such as pre-shared keys or public/private keys could also be used.

Access could also be granted based on a validity of the device, e.g., an indication that the device originates from an original equipment manufacturer or approved, certain supplier or second party, or based on whether the device can be linked to some other valid true party.

Another type of local-based authentication or approval can check a user or plug-in status, such as a payment subscription status (e.g., determining whether a subscription status is active for an account within a remote-services system, such as the OnStar® system).

In one embodiment, a successful device authentication will activate a relay connection in the onboard vehicle module (e.g., BCM) that in turn activates an antenna connection between the plug-in device and a rooftop antenna of the vehicle.

In some embodiments, remote-focused authentication processes or protocols are used, instead or along with local-based processor or protocols, to enable antenna access. A back-office connection, which may be accessed, e.g., via a cellular modem of the plug-in device or via a proxy request to the vehicle communication system, may be used in authentication the plug-in and/or user for enabling use of the physical antenna connection.

Such remote authentication may be useful when the device owner must purchase a service in order to activate device functionality or when security certificates must be acquired in order to enable communication access. In cases where the plug-in device is requesting a certificate or credential from a remote site, a temporary connection to the antenna may be provided specifically for system management or configuration purposes.

While the above description regarding authentication and security features is provided primarily with respect to approving access to a vehicle antenna, authentication can be used prior to providing other access to the communication component—for instance, a plug-in device, such as a DSRC module). As an example, such authentication, whether local-based and/or remote-focused, can be performed prior to delivering certain or any data, e.g., proprietary data, to the communication component. These authentication, or security, routines are described further below in connection with FIG. 13.

In one embodiment, one or all of the components of the system 200 (e.g., SAS components) are, before installation on the vehicle 12, pre-arranged, or pre-packaged as or in a kit. As one example, the kit can include the onboard diagnostics port-expansion device 202 and any connecting hardware and/or software components—e.g., hardware 204, 206.

As another example, the kit can also include communication-system components, such as DSRC plug-in components or components of another plug-in. In one embodiment, the components (e.g., SAS component) of the system 200 are provided in a first kit and the communication plug-in system components are provided in a separate kit.

In one contemplated embodiment the kit includes one or more traditionally OEM components, such as an onboard diagnostics device (e.g., OBD-II), a remote-services module, an RS antenna or other vehicle antenna. One use of such a kit would be to provide parts from a supplier to the OEM for installation on the original vehicle.

The kit(s) can be made available, for instance, by OEM entities, post-vehicle sale, or by vehicle dealerships service departments.

The vehicle 12 can be adapted, using such kit(s), or by the parts even if not kitted, to provide access to the remote-services antenna—e.g., antenna of OnStar® system, and without interfering with onboard diagnostics—e.g., operation of the OBD-II.

In one embodiment, the OEM in making the original vehicle includes provisions facilitating implementation of the present system 200. The provisions can be considered a part of the system or only for use in connection therewith. The provisions can include, e.g., the OEM including in the vehicle, to accommodate the expected future plug-in device, some cabling into a harness that will be used to connect the plug in or plug-in-related equipment (e.g., expansion port). In one embodiment, the special accommodations include one or more aspects of the present system 200 components, such as a standard or optional plug-in package including the cabling, one or more connectors of the system 200, etc. The accommodations can be positioned out of sight, for example, behind the interior cover into which the onboard diagnostics connector is mounted.

IV. FIG. 3—SECOND EXAMPLE CONVENTIONAL ARRANGEMENT

FIG. 3 illustrates schematically a second system 300 of another conventional vehicle 14.

Like the system 100 of FIG. 1, this system 300 includes a remote-services module 104 and a remote-services connection point 106 connecting the remote-services module 203 to a connection line 108.

The connection line 108 connects the remote-services module 203 to a remote-services antenna 110. As provided, an example on-vehicle remote-service system is the OnStar® system.

V. FIG. 4—SHORT-RANGE MODULE INLINE WITH RS ANTENNA

FIG. 4 illustrates schematically a system 400, according to a second embodiment of the present technology. The system 400 is installed into, or configured for installation to, a vehicle 16, which is also shown schematically.

The system 400 of FIG. 4 includes a new remote-services inline terminal 402. The remote-services inline terminal 402 may be referred to by any of a variety of names without departing from the present disclosure. Example names include remote-services (RS) inline terminal, RS auxiliary connector, RS inline device, inline device, the like, or other.

The remote-services inline terminal 402 is connected to or configured for connection to a remote-services module 203, of the vehicle 16, as shown in FIG. 4. The remote-services module 203 can be like that described above, such as by including a module of the OnStar® system.

In one embodiment, the inline terminal 402 is positioned, or configured to be positioned, in the vehicle 16 adjacent or otherwise near, close, or proximate to the RS module 203. In one contemplated embodiment, the inline terminal 402 is positioned, or configured for positioning, in the vehicle 16 more remote to the RS module 203.

In one embodiment, the inline terminal 402 is connected to, or configured to connect to, or near the onboard diagnostics port, such as the port 102 described above in connection with various embodiments. And because the diagnostics port 102 can be, as required for OBD-II connectors, positioned or configured for being positioned, within a couple of feet of the steering wheel, or at least generally within reach of the driver, the inline terminal 402 can likewise be positioned, or configured for being positioned, within a couple of feet of the steering wheel, or at least generally within reach of the driver.

The inline terminal 402 may have any of a variety of configurations without departing from the present invention. In one embodiment, the inline terminal 402 includes a terminal, or module, for facilitating short-, medium-, and/or long-range communications. An example terminal is a dedicated short-range communications (DSRC) module or terminal. DSRC, including its capacity to support emergency communications and signaling, is described above.

The inline terminal 402 is connected via a first connection line 404 to a first connection point 406 at, adjacent, or near the remote-services module 203. As in the first exemplary system 200, the RS module 203 in this embodiment can be connected via second connection point 106 to a second connection line 108, which in turn connects to a remote-services antenna 110. And, as with the system 200 of FIG. 2, the connection point 406 of this system 400 can be, be connected to, include, or be a part of the connection point 106.

With continued reference to FIG. 4, the inline terminal 402 is further connected via a third connection line 408 to a third connection point 410 at or near the remote-services module 203.

The first connection line 404, which can be referred to as a first SAS connection line 404, for example, is in one embodiment a radio-frequency (RF) coaxial cable. And, like the connection line 204 of the first system 200, the present connection line 404 (e.g., SAS connection line) of this embodiment is not limited to being an RF coax cable, as other types of RF cables, coaxial cables, or other types of connection may be used without departing from the scope of the present disclosure.

The third connection line 408 can be any of a variety of types. In one embodiment, the third connection line 408 is a radio-frequency (RF) coaxial cable. And like the connection line 204 of the first system 200 and the connection line 404 described above, this third connection line 406 is not limited to being an RF coax cable, as other types of RF cables, coaxial cables, or other types of connection may be used without departing from the scope of the present invention.

As with the system 200 described above in connection with FIG. 2, the system 400 of FIG. 4 is in some embodiments implemented so as to leverage at least one existing hardware or software element of the vehicle 186. For example, the system 400 can leverage the first connection point 106, by using the same (e.g., screw terminal or post) for the second connection point 406, as referenced above.

As another example of leveraging, the connection line 404 can be, include, or be a part of existing connections used by the remote-services system (RS module, RS antenna, etc.). The connection lines 404 can, for instance, be, include, or be a part of cellular cabling or other type of cabling pre-existing in connection with the remote-services system.

As another example of leveraging, the connection line 408 can be, include, or be a part of existing connections used by the remote-services system (RS module, RS antenna, etc.). The connection lines 408 can, for instance, be, include, or be a part of cellular cabling or other type of cabling pre-existing in association with the remote-services system.

The present system 400 can include any of the features described herein regarding other of the disclosed systems. For example, as with the first example system 200, the present system 400 can include, or at least facilitate (such as by providing an appropriate port for DSRC plug-in), any of the additional functions described above, such as a plug-in including a DSRC and comprising DSRC safety-related applications, the communication and/or use of vehicle-related open and/or proprietary data, vehicle-control functions, communications using remote-services module, and communications with other vehicle modules.

As also with the first example system 200, in one embodiment the present system 400 can include or be used in connection with special accommodations—e.g., pre-installed cabling and/or other hardware and/or software.

And, as also with the first example system 200, in one embodiment, one or all of the components (e.g., SAS components) of the second example system 400 are, before installation on the vehicle 16, pre-arranged, or pre-packaged into a kit. As an example, the kit can include the remote-services inline terminal 402 and any connecting hardware and/or software components—e.g., hardware 404, 408.

As another example, the kit can also include communication-system components, such as DSRC plug-in components, components of another plug-in, etc. In one embodiment, the components of the system 400 are provided in a first kit and the communication (e.g., plug-in) system components are provided in a separate kit.

In one contemplated embodiment the kit includes one or more traditionally OEM components, such as an onboard diagnostics device (e.g., OBD-II), a remote-services module, an RS antenna or other vehicle antenna. One use of such a kit would be to provide parts from a supplier to the OEM for installation on a new vehicle.

The one or more kits can include components configured according to the present technology, including according to the teachings herein. The kit(s) can be made available by, for instance, OEM entities, post-vehicle sale, or by vehicle dealership service departments.

VI. FIG. 5—THIRD EXAMPLE CONVENTIONAL ARRANGEMENT

Figure 5:
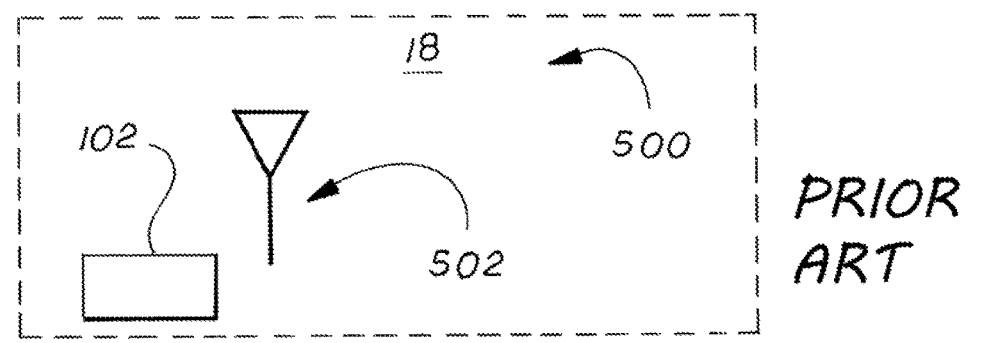
FIG. 5 illustrates schematically a third conventional vehicle comprising a vehicle antenna and an onboard diagnostics port.

FIG. 5 illustrates schematically a third conventional vehicle 18.

The system 500 includes an onboard diagnostics connector, or port 102 and a vehicle antenna 602.

VII. FIG. 6—OBD PORT EXPANSION-TO-VEHICLE ANTENNA

Figure 6:
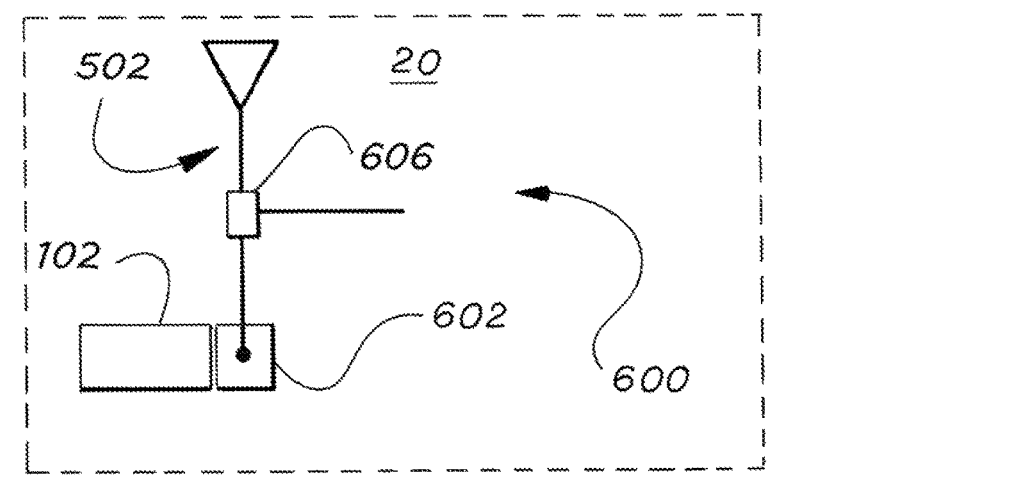
FIG. 6 illustrates schematically a system, according to a third embodiment of the present technology, comprising an onboard diagnostics port expanding device being positioned adjacent an onboard diagnostics port and linked by connection line to a vehicle antenna.

As referenced, FIG. 6 illustrates a system 600, according to a third embodiment of the present technology, shown schematically in association with a vehicle 20.

The system 600 of the third embodiment includes an onboard diagnostics port-expansion device 602. The OBD port-expansion device 602 can be like the OBD port-expansion devices described above—e.g., OBD port-expansion device 202 of FIG. 2.

The OBD port-expansion device 602 connects to the vehicle antenna 502. The system 600 also includes SAS connector-to-remote services module (SASC-to-RSM) connection point 606, which can be like the SAS connectors 206, 406 of prior embodiments.

In one embodiment, the OBD port-expansion device 602 is connected to, or configured to connect to, the diagnostics port 102. And because the diagnostics port 102 can be, as required for OBD-II connectors, positioned or configured for being positioned, within a couple of feet of the steering wheel, or at least generally within reach of the driver, the onboard diagnostics port-expansion device 602 can likewise be positioned or configured for being positioned within a couple of feet of the steering wheel, or at least generally within reach of the driver.

The present system 600 can include any of the features described herein regarding other of the disclosed systems. For example, as with the first example system 200, the present system 600 can include, or at least facilitate (such as by providing an appropriate port for DSRC plug-in), any of the additional functions described above, such as a plug-in including a DSRC and comprising DSRC safety-related applications, the communication and/or use of vehicle-related open and/or proprietary data, vehicle-control functions, communications using remote-services module, and communications with other vehicle modules.

As also with the first example system 200, in one embodiment the present system 600 can include or be used in connection with special accommodations—e.g., pre-installed cabling and/or other hardware and/or software.

The system 600 can also be kitted, as described above in connection with other embodiments of the present technology.

VIII. FIG. 7—OBDPE-TO-REMOTE-SERVICES ANTENNA WITH ECU

As provided, FIG. 7 illustrates a system 700, according to a fourth embodiment of the present technology, schematically in association with a vehicle 22.

The system 700 includes components that can be like those of the first embodiment, described above in connection with FIG. 2. The similar components are referenced by common reference numerals in FIG. 7 and FIG. 2. Descriptions above regarding those components are for brevity not reproduced into this section regarding FIG. 7, and are considered incorporated here by preference.

The system 700 further includes the mentioned computing device 702, which may be, include, or be a part of a body-control module of the vehicle 22. The computing device 702 is operatively connected to, e.g., the remote-service module 203 and/or the onboard diagnostics port 102 for affecting operations associated with the module 203 and/or the port 102.

In one contemplated embodiment, the computing device 702 communicates with an inline remote-services terminal, such as the terminal 402 described above. And in another embodiment, the computing device 702 communicates with an onboard diagnostics port-expansion device, such as OBDPED 202.

The computing device 702 can be connected to the remote-service module, OBD port 102, or other (e.g., inline terminal 402 and/or OBDP 202) by wire and/or wirelessly, as describe further below. One or more of the connections 704, 706 shown are in some embodiments wired, and one or both are in some embodiments representative of a wireless connection.

The system 700 can also be kitted, as described above in connection with other embodiments of the present technology.

IX. FIG. 8—AUTOMATED DEVICE

Figure 8:
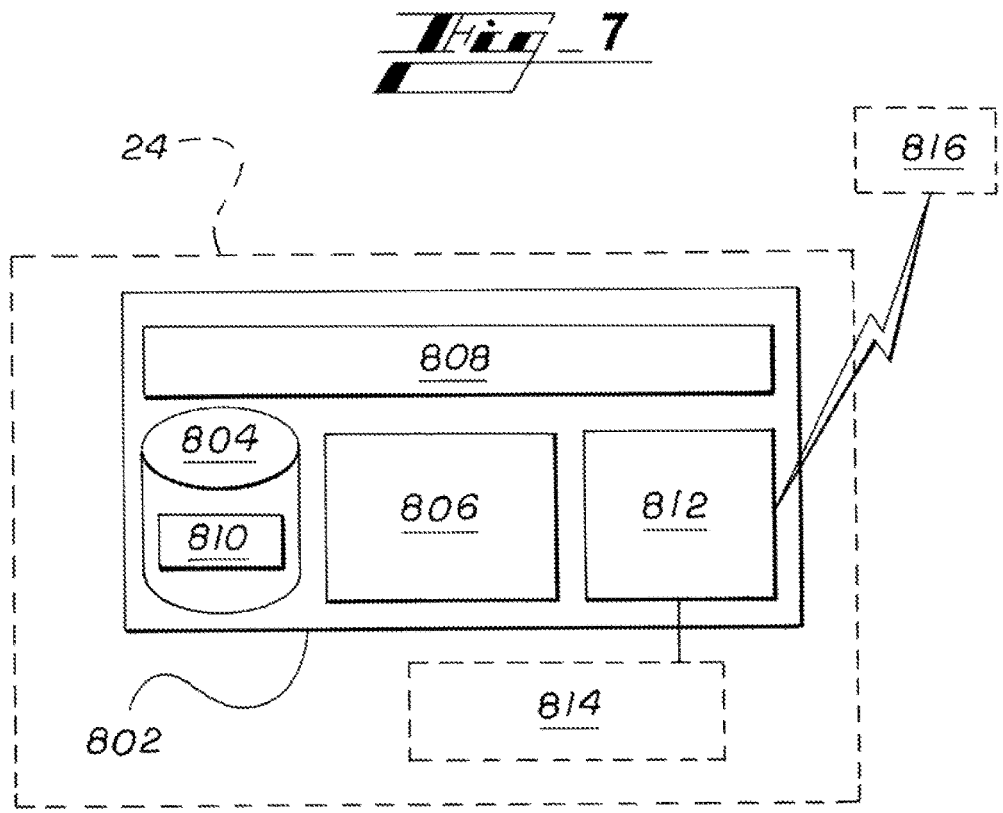
FIG. 8 illustrates an example of the computing device of FIG. 7 in more detail.

FIG. 8 illustrates in an automated device 802, such as a computing sub-system.

The automated device 802 can be, include, or be part of the automated device 702 referenced above in connection with FIG. 7. Accordingly, the vehicle 24 indicated schematically in FIG. 8 could be the vehicle 22 of FIG. 7.

And, as shown in FIG. 7, and described above, the automated device 802 can be connected to the remote-service module 203 and/or the onboard diagnostics port 102 for affecting operations associated with the module 203 and/or the port 102. And in one contemplated embodiment, the automated device 802 is part of or in operative communication with the system 400 of FIG. 4, for use in operation of the system 400.

The automated device 802 may be referred to by any of a variety of names, without departing from the scope of the present technology, and in some cases depending on the embodiment, such as computing device, computing sub-system electronic control unit (ECU), computer device, computing sub-system, computer sub-system, controller, controller device, controller sub-system, processing system, processing unit, computer unit, body control unit, control module, unit, or device, the like, or other.

In some embodiments, the automated device 802 is part of or in operative communication with a primary vehicle computer, such as a body control module (BCM).

The automated device 802 in some embodiments includes a memory, or computer-readable medium 804, such as volatile medium, non-volatile medium, removable medium, and non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The automated device 802 in some embodiments also includes a computer processor 806 connected to, connectable to, or otherwise in operative communication with the computer-readable medium 804. The connection is made via a communication link 808, such as a computer bus, which can be wired and/or wireless-based.

The computer-readable medium 804 includes computer-executable instructions 810. The computer-executable instructions 810 are executable by the computer processor 806 to cause the processor, and thus the computing device 802, to perform all or any combination of the functions described in the present disclosure, including those described above in connection with FIG. 13.

The computer-executable instructions 810 can be arranged in one or more software modules. The modules can be referred to by the operations or operations that they cause the computer processor 806 to perform. For instance, a module including instructions that, when executed by the processor 806, cause the processor to perform an operation of communicating with the remote-services module can be referred to as an RS-communications module, an RS module, a communications module, or the like.

The term software module, or variants thereof, is used expansively herein to include routines, program modules, programs, components, data structures, algorithms, and the like. Software modules can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

The processor 806 is also connected or connectable to at least one interface 812 for facilitating communications between the automated device, or sub-system 802 and local components 814, and between the computing sub-system 802 and remote components 816.

For communicating with the local components 814, the interface 812 can include one or both of wired interface components and wireless interface components—e.g., transceiver, transmitter, and/or receiver.

Example local components 814 in FIG. 8 include the OBD port 102, the RS module 203, the OBD port-expansion device 202, the inline RS terminal 402, and local instrumentation, such as a vehicle-to-user interface (e.g., touchscreen display), or vehicle diagnostics equipment, which that may be connected selectively to the vehicle, e.g., to the interface 812, directly.

For communicating with the remote components 816, the interface 812 includes a transceiver capable of facilitating any or all of short-range, medium-range, and long-range communications.

The remote components 816 can include databases, servers, other processors, other storage mediums, and/or other computing devices. The interface can include a transmitter, receiver, or transmitter that is wired and/or wireless-based for supporting wired and/or wireless protocol communications, respectively.

Although shown as being a part of the computer sub-system 802, completely, the interface 812, or any aspect(s) thereof, can be partially or completely a part of the sub-system 802. The interface 812, or any aspect(s) thereof, can be partially or completely external to and connected or connectable to the computing sub-system 802.

X. FIG. 9—ONBOARD DIAGNOSTICS PORT

FIG. 9 shows an example onboard diagnostics port 900. As referenced above, the port 900 is a conventional OBD-II port, which can be installed in a conventional vehicle 26.

XI. FIG. 10—PORT EXPANDER-TO-DIAGNOSTICS PORT CONNECTION

FIG. 10 shows a system 1000 including an onboard diagnostics port-expansion device 1002 for being connected to the onboard diagnostics port 900 of FIG. 9.

Arrow 1004 indicates an act of installing the OBDPED 102 at or adjacent the OBDP 902.

In one embodiment, the OBDPED 1002 includes at least one PED connector 1006, and the OBD 900 includes at least one OBD connector 1008. Mounting the OBDPED 1002 in the vehicle 28 can include connecting the PED connector 1006 to or adjacent the OBD connector 1008.

The OBDPED 1002 is connected, e.g., by wire (not shown in detail in FIGS. 9 and 10), to other vehicle 28 components—e.g., remote-services module, remote-services antenna, vehicle antenna, etc., as described elsewhere herein.

The system 1000 can be kitted, as described above in connection with other embodiments of the present technology.

XII. FIG. 11—PORT EXPANDER/OBD SYSTEM

FIG. 11 shows the new system 1100 in which the onboard diagnostics port-expansion device 1002 connected to or adjacent the onboard diagnostics port 900, following the act shown in FIG. 10.

A PED-OBD connection point 1102 is indicated by reference numeral 1102. As provided, in one embodiment, the connection point 1102 includes the PED connector 1006 linked to or with the OBD connector 1008.

The present system 1100 can include any of the features described herein regarding other of the disclosed systems. For example, as with the first example system 200, the present system 1100 can include or at least facilitate (such as by providing an appropriate port for DSRC plug-in) any of the additional functions described above, such as a plug-in including a DSRC and comprising DSRC safety-related applications, the communication and/or use of vehicle-related open and/or proprietary data, vehicle-control functions, communications using remote-services module, and communications with other vehicle modules.

As also with the first example system 200, in one embodiment the present system 1100 can include or be used in connection with special accommodations—e.g., pre-installed cabling and/or other hardware and/or software.

XIII. FIG. 12—ONBOARD DIAGNOSTICS PORT JUMPER ARRANGEMENT

Figure 12:
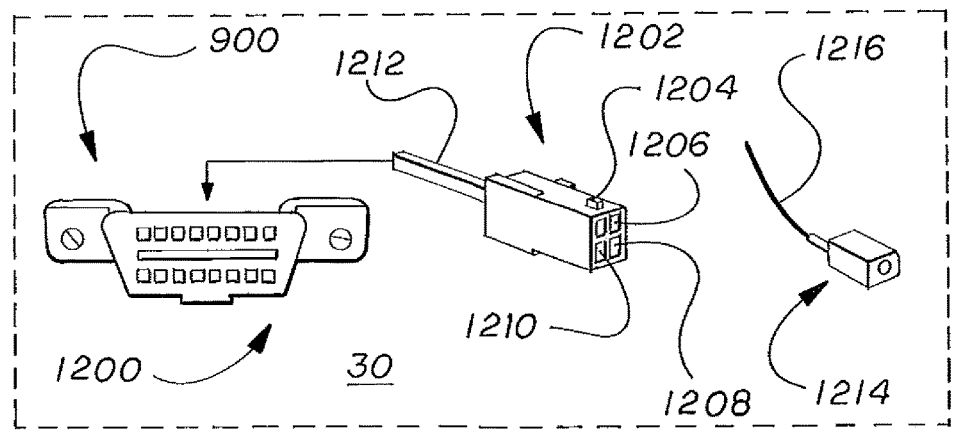
FIG. 12 illustrates an inline onboard diagnostics port jumper being integrated into the onboard diagnostics port of FIG. 9.

FIG. 12 illustrates a system 1200 including an onboard diagnostics port jumper 1202. The jumper can for some embodiments be referred to as being inline because of how it connects to system components such as a remote-services module.

The OBD jumper 1202 (e.g., IOBD jumper) is mounted in the vehicle 30, such as to, at, or adjacent an onboard diagnostics port 900.

While the OBD jumper 1202 (e.g., IOBD jumper) can be configured in any of a variety of ways without departing from the scope of the present technology, FIG. 12 shows any embodiment in which the jumper 1202 includes four (4) pins or pin-receptacles 1204, 1206, 1208, 1210. The jumper 1202 may have, for instance, other numbers of sub-connections (e.g., one, two, three, or more than four) and/or other types of sub-connections.

In one embodiment, the jumper 1202 is integrated into the onboard diagnostics port 900. The jumper 1202 may be, e.g., installed adjacent the existing sixteen (16) connection points of the port 900, or connected to the port 900 so that the jumper 1202 is accessible via one of the connection points of the port 900.

The jumper 1202 is in various embodiments connected to, or configured to be connected to, any one or more of the system components described herein—e.g., a remote-services module, a remote-services antenna, a vehicle antenna, etc.

A connecting line 1212 is in one embodiment a radio-frequency (RF) coaxial cable. The line 1212 is not limited to being an RF coax cable, though, as other types of RF cables, coaxial cables, or other types of connection may be used without departing from the scope of the present invention.

FIG. 12 also shows another type of jumper 1214 that can be implemented in the system 1200 instead of or along with the first jumper 1202 shown in the figure. This second jumper 1214 is in one embodiment configured especially for connection to a specific system component, such as for connection to a remote-service module—e.g., the module 203 described above.

A second connecting line 1216 shown in FIG. 12 is in one embodiment a radio-frequency (RF) coaxial cable. As with other lines described herein, the second line 1216 is not limited to being an RF coax cable, and can include, e.g., other types of RF cables, coaxial cables, or other types of connection may be used without departing from the scope of the present invention.

The jumper 1202 is in various embodiments connected to, or configured to be connected to, any one or more of the system components described herein—e.g., a remote-services module, a remote-services antenna, a vehicle antenna, etc.

Either or both jumpers 1202, 1214, and their connecting lines 1212, 1216, as with each component (e.g., OBDPE, IRST, etc.) and corresponding connecting lines described herein, can be configured to transfer any or all of a variety of items—such as power, data, other signals, and connectivity for improved transmission and/or reception—to and/or from the component (e.g., jumper, OBDPE, IRST) from and/or to one or more of the other system components (e.g., a remote-services module, a remote-services antenna, a vehicle antenna).

The present system 1200 can include any of the features described herein regarding other of the disclosed systems. For example, as with the first example system 200, the present system 1200 can include or at least facilitate (such as by providing an appropriate port for DSRC plug-in) any of the additional functions described above, such as a plug-in including a DSRC and comprising DSRC safety-related applications, the communication and/or use of vehicle-related open and/or proprietary data, vehicle-control functions, communications using remote-services module, and communications with other vehicle modules.

As also with the first example system 1200, in one embodiment the present system 400 can include or be used in connection with special accommodations—e.g., pre-installed cabling and/or other hardware and/or software.

As with all systems described herein, the system 1200 described in connection with FIG. 12 can be kitted, as described above in connection with other embodiments of the present technology.

XIV. ADDITIONAL EMBODIMENTS INVOLVING REMOTE-SERVICES MODULE

As referenced above regarding FIG. 2, in section III., the present section describes additional embodiments involving the remote-services module 203, the port expansion device 202, the connection point 206, and/or the connection line 204.

In some embodiments, the remote-services module 203, e.g., a module for an OnStar® system, operates as a receiver of all of the signals that would be required for the present technology, e.g., by the port-expansion device 202 and/or the inline terminal 402. Example signals include power, serial data, and antenna RF signals.

Although a connector 206 is referenced above in the singular tense, the module 203 can include more connectors, or connector pins. In one embodiment, the module 203 includes at least three (3) connectors (not shown in detail). Of the three, two can be dedicated to generally pre-existing vehicle functions—e.g., operations that the remote-services module 203 has traditionally performed, generally outside of the present technology. The third connector can be used, e.g., to connect the module 203 to diagnostic tools, such as to test the module 203 in manufacturing. It is contemplated that other components of the present technology (including, e.g., the port-expansion device 202 and/or the inline terminal 402) could in some embodiments tie into one of such three ports, depending, e.g., on how the remote-service module 203 is configured.

In one embodiment, a circuit board (e.g., PCB) of the remote-services module 203 is configured (e.g., board traces or routing arranged) so that signals that are required by other system components (including, e.g., the port-expansion device 202 and/or the inline terminal 402) would come into the module 203 on the first and second connectors, referenced above, and transferred to the third connector. In a particular embodiment, the signals are transferred to pins of the third connector that are otherwise open, or unused. The other system components (including, e.g., the port-expansion device 202 and/or the inline terminal 402) would tie into the remote-services module 203 at that third connector, e.g., to the open pins.

As referenced above, some signals to be used by the other components of the present technology (including, e.g., the port-expansion device 202 and/or the inline terminal 402) can also be used by the remote-services module 203 and other vehicle or non-vehicle systems. A primary example would be location signals, such as those carrying GPS data. For this reason, the remote-services module (e.g., PCB thereof) would in this embodiment be configured (e.g., board traces or routing arranged) so that the signals transported to the third connector (e.g., open pins thereof) are also carried to other module locations as needed, such as a processor thereof, other pins for transmission to other devices, local or remote, etc. The provision of signals to third connector (e.g., open pins thereof) could of course be made generally simultaneously with the provision of the same to other parts of the remote-services module or other devices, local or remote, as needed.

In one embodiment, the third connector of the remote-services module 203 is configured to carry only electrical signals, and not antenna RF signals. In this case, provision can be made for providing RF signal connection to the other components of the present technology (including, e.g., the port-expansion device 202 and/or the inline terminal 402). In one implementation, a splitter or similar device or arrangement is used to provide RF signal connection between the antenna 110 and the other components of the present technology (including, e.g., the port-expansion device 202 and/or the inline terminal 402). The splitter can be considered shown schematically in FIG. 2 by reference numeral 207 and/or by reference numeral 410 (FIG. 4).

It will be appreciated that design or redesign of the remote-service module, and entire system, should be done with care because of the other important functions of the module, including safety-related functions.

In another embodiment, an intermediate device, such as a break-out style harness, is used to facilitate provision of needed signals from the remote-services module to the other components of the present technology. In one implementation of this embodiment, connectors that are, or otherwise would usually be, plugged directly into the remote-services module, would instead be plugged into the intermediate device. The intermediate device of this embodiment can be considered shown schematically in FIG. 2 by reference numeral 207 and/or by reference numeral 410 (FIG. 4). This intermediate device has a first connector (not called out in detail) that plugs into the remote-services module 204, which would pass all of the original signals through to/from the module 203, and a second connector by which the other system components (e.g., 202, 402) would receive the signals needed by them. It is noted that the same reference(s) (207/410) being used to describe the intermediate device of this embodiment as well as the splitter of the other embodiment described above, for convenient disclosure, does not foreclose the possibility of the system including both the splitter and the intermediate device.

As referenced, intra-system communications can be wired or wireless. In particular, for instance, required serial data information can be transmitted from the remote-service module 203 as data over short-range devices, using a corresponding short-range wireless protocol. Example protocols including WIFI and BLUETOOTH. The wireless transmissions can be used instead of or along with wired connections. In one case, a wired connection is present as a backup. One benefit of providing such data wirelessly, is avoiding need of hard connection by the system components to, e.g., a main vehicle computer (e.g., BCM) just to get the data. The system components receiving such data would still receive their antenna, power, and ground connections according to any of the ways described herein.

XV. FIG. 13—METHODS OF IMPLEMENTATION

Figure 13:
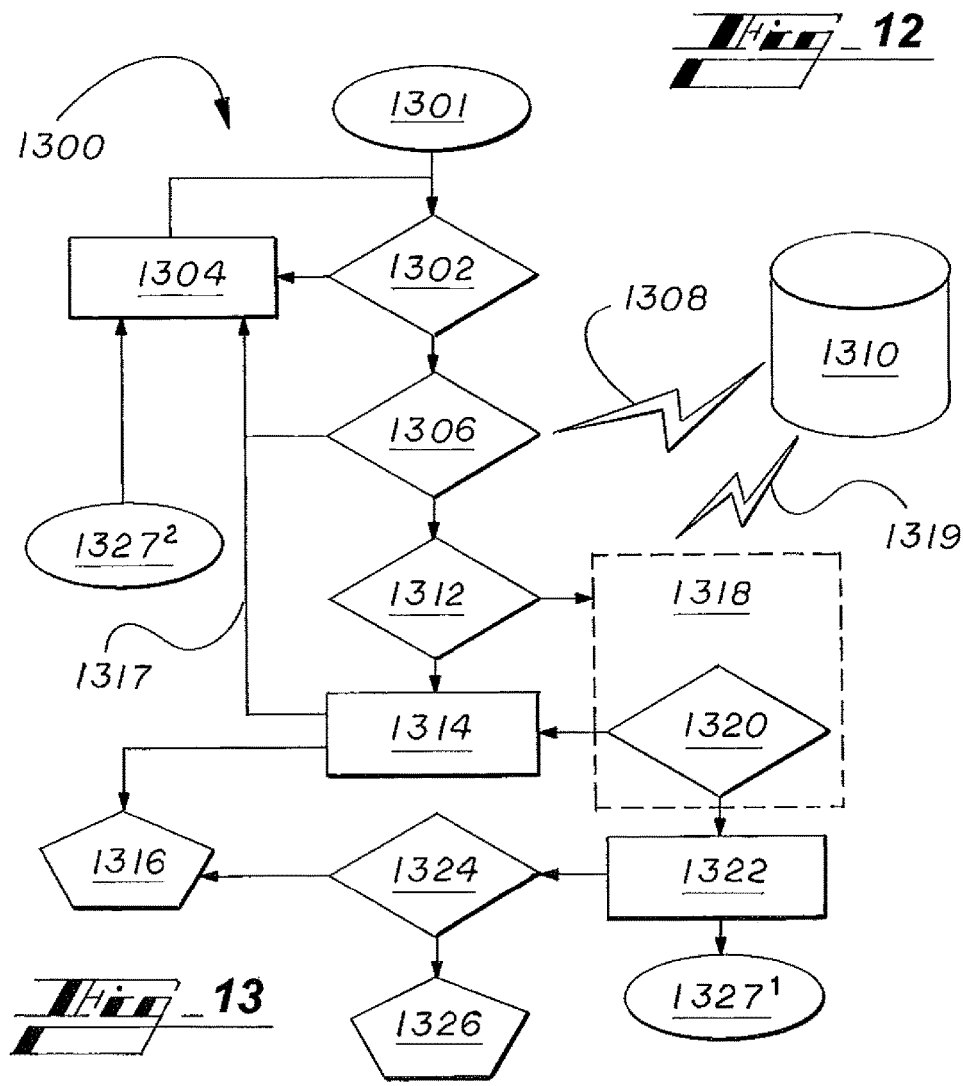
FIG. 13 shows an exemplary method of operation, according to an embodiment of the present disclosure.

FIG. 13 shows an exemplary method 1300 for facilitating smart-antenna sharing, according to an embodiment of the present disclosure.

It should be understood that the steps of the method 1300 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 1300 can be ended at any time.

In certain embodiments, some or all steps of this process, and/or substantially equivalent steps are performed by a processor, e.g., computer processor, executing computer-executable instructions stored or included on a computer-readable medium, such as the memory 804 of the automated sub-system system 802 described above.

And as described above, the automated sub-system 802 may be referred to by any of a variety of names, without departing from the scope of the present technology, and in some cases depending on the embodiment, such as computing device, computing sub-system electronic control unit (ECU), computer device, computing sub-system, computer sub-system, controller, controller device, controller sub-system, processing system, processing unit, computer unit, body control unit, control module, unit, or device, the like, or other.

And the automated sub-system 802 is, in some embodiments, part of or in operative communication with a primary vehicle computer, such as a body control module (BCM). In some embodiments, it is preferred that some or all of the present logic be included in a body control module (BCM), such as for cases in which authentication by the vehicle of the plug-in device (e.g., DSRC module connecting to a port expansion, according to the present technology) is required.

The method 1300 begins 1301 and flow proceeds to decision diamond 1302, whereat the processor, executing computer-executable instructions outlining an algorithm, determines whether a connection to a plug-in device (e.g., DSRC module connected to a port expansion) has been made or is being requested or attempted. The connection can be over a system bus.

In response to a negative response at decision 1302—i.e., a connection or connection attempt is not identified, flow of the algorithm, proceeds to block 1304, whereat the processor proceeds to or returns to a waiting routine. In one embodiment, the waiting includes causing a system device, such as the plug-in device, to go into, or remain in, a sleep mode.

From routine 1304, the process 1300 can end or be repeated. In one embodiment, in which the process is repeated, the processor can, in repeating the process, perform a polling function, such as polling the connection (e.g., bus) for device (e.g., plug-in device) responsiveness.

In one embodiment, in response to a positive determination at decision 1302—i.e., a connection or connection attempt is identified, the processor initiates providing of a signal to indicate that the connection is being attempted, or the initial connection for authentication, has been made. The signal can be provided to a vehicle and/or a remote destination. The signal can include, for instance, a vibration provided by way of the plug-in, which would be felt by a person connecting the device manually (e.g., plugging the device into the port expansion). Other example signals include light (e.g., yellow light, blinking light), voice, tone, and display screen message.

In any event, in response to the positive response at decision 1302, flow of the algorithm, proceeds to decision diamond 1306, whereat the processor performs an antenna-access authentication routine. As provided above, authentication according to the present technology in some embodiments includes local-based authentication functions and/or remote-focused authentication functions. The remote-focused authentication functions are referenced schematically by a remote connection 1308 (e.g., long- and/or short-range wireless communications) between the vehicle and a remote source 1310, such as a remote-services center like the OnStar® center or server, or other remote server. As also provided, the remote connection can be performed by the vehicle (e.g., BCM using vehicle antenna) without the plug-in, or the processor may allow the plug-in temporarily, e.g., only for obtaining the authorization to use the antenna.

Responsive to a negative determination at decision 1306—i.e., communication device (e.g., plug-in) is not successfully authorized in the local and/or remote authentication routine, flow of the algorithm proceeds to block 1304. The operations associated with block 1304 are described above.

From a positive determination at decision 1306—i.e., communication device (e.g., plug-in) is successfully authorized in the local and/or remote authentication routine, flow of the algorithm proceeds to decision diamond 1312. At the decision 1312, the processor determines whether the connection via which the communication device (e.g., plug-in device; e.g., DSRC module) is being made is via a known or approved vehicle interface. The operation can include, e.g., the processor confirming that the communication device (e.g., DSRC) is connected to the processor by way of a proper port expansion device (e.g., OBDPED). The operation can include the processor confirming that the communication device is not connected via an improper channel, such as an illegal port of the onboard diagnostics device (e.g., OBD-II).

Responsive to a negative determination at decision 1312—i.e., the processor determines that the relevant vehicle interface is not appropriate or authorized, flow of the algorithm continues to block 1314. At block 1314, the processor limits functions to standalone operation. Standalone operations are mentioned above. In this mode, the communication device (e.g., DSRC plug-in) may be able to operate, but without access to or use of certain data—e.g., vehicle operation or movement data, which may be proprietary, for instance. The communication device (e.g., DSRC module) can thus communicate with remote devices—e.g., other vehicles (V2V), infrastructure (V2I), etc. (V2X). The allowance of standalone operations can support general safety functions.

As part of the operations at block 1314, or thereafter, flow can proceed to block 1316, whereat the processor initiates provision of a notification or signal, e.g., an alert. In one embodiment, the alert is provided to the communication device. In one embodiment, the notification is provided to a vehicle and/or a remote destination. The signal can include, for instance, a vibration provided by way of the plug-in, which would be felt by a person connecting the device manually (e.g., plugging the device into the port expansion). Other example signals include light (e.g., red light), voice, tone, and display screen message.

From block 1314/1316, flow of the algorithm proceeds to block 1304. The operations associated with block 1304 are described above. In transitioning to block 1304, as indicated by reference numeral 1317, the processor effectively turns off or otherwise interrupts any communication channel—e.g., communication bus, between the communication device and disallowed vehicle resources, such as between the DSRC module and a source of proprietary vehicle data.

Responsive to a positive determination at decision 1312—i.e., the processor determines that the relevant vehicle interface is appropriate or authorized, flow of the algorithm proceeds to block 1318. At block 1318, the processor performs a data-access authentication/authorization routine. The routine, used to determine whether the communication device should be allowed access to certain vehicle data, such as proprietary vehicle motion and operation data, can be like or the same as any authorization routine(s) described above, such as by using local-based and/or remote-focused, e.g., using wireless link 1319 to a remote server 1310.

At subsequent decision diamond 1320, the processor determines, based on or as part of the routine 1318, whether the communication device (e.g., DSRC plug-in) is authorized to receive the select vehicle data.

Responsive to a negative result at decision 1320, flow proceeds to operation 1314, which is described above.

Responsive to a positive result at decision 1320, flow proceeds to block 1322, whereat the processor allows performance of full or fully-authenticated communications by the communication device. In this mode, which may be referred to as a connected-operation mode, the communication device can communicate with remote devices—e.g., other vehicles (V2V), infrastructure (V2I), etc. (V2X), unrestricted by the processor, or at least with less restriction than would be imposed for the standalone mode (reference operation 1314). As described above the system can be configured so that the communication device can have access to not only vehicle location data (e.g., GPS data), but also vehicle motion and/or operation data (e.g., brake status, acceleration information, engine temperature, camera data, laser data, etc.).

Following operation 1322, or as part of that operation 1322, flow proceeds along a transition 1323 for providing an alert or other notification regarding current system or communication device status. At diamond 1324 determines whether display access should be approved in connection with functions of the communication device. The access would allow the communication device (e.g., plug-in DSRC module) to use a visual resource of the vehicle, such as a screen display or one or more lights (e.g., LEDs) of the vehicle.

In determining whether to allow communication device access in decision 1324, the process can consider, e.g., who the driver is, default settings or preferences in the vehicle or remote to the vehicle (e.g., at an OnStar® server), driver preferences, whether the vehicle is running, whether the vehicle is moving above a certain speed (e.g., moving at all), a present mode or status of the vehicle (such as whether a vehicle display is already being used to communicate an important message, or navigation data, etc.), the like, or other.

Responsive to a negative determination at decision 1324, flow can proceed to block 1316 whereat an alert or other notification can still be provided, according to the operations described above in connection with block 1316. From there 1316, the method can end or repeat.

In response to a positive determination at decision 1324, flow can proceed to block 1326, whereat the communication device is allowed to provide notification via tactile communication (e.g., vibration), auditory (e.g., via speaker), and/or visually such as via the vehicle display. The notification or alert can advise, e.g., that the communication device is authorized for connected-mode operation. From here, the device (e.g., plug-in DSRC module) performs its ongoing functions.

Thereafter, flow proceeds along the indicated flow path $1327^1/1327^2$ to block 1304, or the method 1300 can from here, as in all places, end or repeat. In the indicated transition 1327, as with the above-referenced transition 1317, the processor in some embodiments effectively turns off or otherwise interrupts any communication channel—e.g., communication bus, between the communication device and disallowed vehicle resources, such as between the DSRC module and a source of proprietary vehicle data.

XVI. RESULTS AND BENEFITS

Smart antenna sharing, according to the present disclosure, enables a consumer plug-in device to use an on-vehicle antenna with minimal vehicle modifications.

The sharing technology also enables rapid deployment of the new communication services, e.g., DSRC, or augmentation of such services.

The technology also enables deployment or augmentation of plug-in communication services for customers at relatively-low cost.

The technology also enables deployment or augmentation of the communication services within applicable regulations.

The technology also enables convenient and secure connection of plug-in or existing communication devices to OEM antenna resources, or other OEM resources, such as a remote-services module.

The technology can be implemented on large scale, to any existing vehicle.

The sharing technology also enables deployment or augmentation of the communication services without interfering with operations of diagnostic tools that connect to an onboard diagnostics port, such as an OBD-II connector.

XVII. Conclusion

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present technology. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed:

1. An onboard-diagnostics-port expansion system, for implementation with a vehicle of transportation, comprising:
   an onboard diagnostics port-expansion device, configured to, for operation of the onboard-diagnostics-port expansion system:
      mount in the vehicle at, or adjacent, an onboard diagnostics port and be connected to at least one pin or channel of the onboard diagnostics port; and
      communicate with an original-vehicle-equipment remote-services module of the vehicle;
         the original-vehicle-equipment remote-services module being configured to communicate with a remote-services computing center being remote to the vehicle and customized to interface with the original-vehicle-equipment remote-services module of the vehicle, and with other original-vehicle-equipment remote-services modules of other vehicles; and
         the original-vehicle-equipment remote-services module being connected, to an original-vehicle-equipment remote-services antenna of the vehicle for communicating with the remote-services computing center; and
   an onboard diagnostics port expansion connection line extending from the onboard diagnostics port-expansion device, the connection line being configured to connect the onboard diagnostics port-expansion device to the original-vehicle-equipment remote-services module and, thereby, to the original-vehicle-equipment remote-services antenna.

2. The onboard-diagnostics-port expansion system of claim 1, wherein the onboard diagnostics port-expansion device comprises security features inhibiting unauthorized access to proprietary vehicle data by way of the onboard diagnostics port-expansion device and the onboard diagnostics port.

3. The onboard-diagnostics-port expansion system of claim 1, wherein at least the onboard diagnostics port-expansion device and the onboard diagnostics port expansion connection line are embodied in a single kit for sale and/or movement in commerce.

4. The onboard-diagnostics-port expansion system of claim 1, further comprising an automated control device configured for operative connection to, and communication with, at least one of the port-expansion device and the original-vehicle-equipment remote-services module.

5. The onboard-diagnostics-port expansion system of claim 1, wherein the vehicle comprises the remote-services module, and the system further comprises:
   an inline remote-services terminal configured for wired connection inline, via a plurality of connection lines, to the original-vehicle-equipment remote-services module;
   a first connection line, of the plurality of connection lines, configured to connect to the inline remote-services terminal and to the original-vehicle-equipment remote-services module; and
   a second connection line, of the plurality of connection lines, configured to connect to the inline remote-services terminal and to the original-vehicle-equipment remote-services module.

6. The onboard-diagnostics-port expansion system of claim 5, wherein the inline remote-services terminal comprises security features inhibiting unauthorized access to proprietary vehicle data by way of the inline remote-services terminal.

7. The onboard-diagnostics-port expansion system of claim 5, wherein the inline remote-services terminal and the plurality of connection lines are embodied in a single kit for sale and/or movement in commerce.

8. The onboard-diagnostics-port expansion system of claim 5, further comprising an automated control device configured for operative connection to, and communication with, the inline remote-services terminal.

9. An onboard-diagnostics-port expansion system, for implementation with a vehicle of transportation, comprising:
   an onboard diagnostics port-expansion device, configured to, for operation of the onboard-diagnostics-port expansion system:
      mount in the vehicle at, or adjacent, an onboard diagnostics port and be connected to at least one pin or channel of the onboard diagnostics port; and
      communicate with an original-vehicle-equipment remote-services module of the vehicle;
   wherein the original-vehicle-equipment remote-services module is configured to communicate with a remote-services computing center being remote to the vehicle and customized to interface with the original-vehicle-equipment remote-services module of the vehicle, and with other original-vehicle-equipment remote-services modules of other vehicles; and
   the original-vehicle-equipment remote-services module is connected to an original-vehicle-equipment remote-services antenna of the vehicle for communicating with the remote-services computing center.

10. The onboard-diagnostics-port expansion system of claim 9, wherein the onboard diagnostics port-expansion device comprises security features inhibiting unauthorized access to proprietary vehicle data by way of the onboard diagnostics port-expansion device and the onboard diagnostics port.

11. The onboard-diagnostics-port expansion system of claim 9, wherein at least the onboard diagnostics port-expansion device and an onboard diagnostics port expansion connection line are embodied in a single kit for sale and/or movement in commerce.

12. The onboard-diagnostics-port expansion system of claim 9, further comprising an automated control device configured for operative connection to, and communication with, at least one of the port-expansion device and the original-vehicle-equipment remote-services module.

13. The onboard-diagnostics-port expansion system of claim 9, wherein the vehicle comprises the remote-services module, and the system further comprises:
- an inline remote-services terminal configured for wired connection inline, via a plurality of connection lines, to the original-vehicle-equipment remote-services module;
- a first connection line, of the plurality of connection lines, configured to connect to the inline remote-services terminal and to the original-vehicle-equipment remote-services module; and
- a second connection line, of the plurality of connection lines, configured to connect to the inline remote-services terminal and to the original-vehicle-equipment remote-services module.

14. The onboard-diagnostics-port expansion system of claim 13, wherein the inline remote-services terminal comprises security features inhibiting unauthorized access to proprietary vehicle data by way of the inline remote-services terminal.

15. The onboard-diagnostics-port expansion system of claim 13, wherein the inline remote-services terminal and the plurality of connection lines are embodied in a single kit for sale and/or movement in commerce.

16. The onboard-diagnostics-port expansion system of claim 13, further comprising an automated control device configured for operative connection to, and communication with, the inline remote-services terminal.

* * * * *